US008115352B2

(12) United States Patent
Neje et al.

(10) Patent No.: US 8,115,352 B2
(45) Date of Patent: Feb. 14, 2012

(54) DYNAMOELECTRIC MACHINE COIL SPACERBLOCK HAVING FLOW DEFLECTING CHANNEL IN COIL FACING SURFACE THEREOF

(75) Inventors: Shriniwas Ananda Neje, Bangalore (IN); Rebinth Jose Robin, Karnataka (IN); Samir Armando Salamah, Niskayuna, NY (US); Vidyapati Tiwari, Chhattisgarh (IN)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 12/405,459

(22) Filed: Mar. 17, 2009

(65) Prior Publication Data

US 2010/0237724 A1    Sep. 23, 2010

(51) Int. Cl.
*H02K 9/00* (2006.01)
*H02K 3/46* (2006.01)

(52) U.S. Cl. ............. 310/54; 310/52; 310/58; 310/260; 310/270

(58) Field of Classification Search .................... 310/61, 310/270, 65, 52, 58, 64; *H02K 1/32, 9/00, H02K 9/06, 9/08, 9/24*
See application file for complete search history.

(56) References Cited

U.S. PATENT DOCUMENTS

| | | | |
|---|---|---|---|
| 3,588,557 A | 6/1971 | Kilgore et al. | |
| 4,182,966 A | 1/1980 | Mishra et al. | |
| 4,656,382 A * | 4/1987 | Moore et al. | 310/270 |
| 5,252,880 A | 10/1993 | Kazmierczak et al. | |
| 5,483,112 A | 1/1996 | Biseli et al. | |
| 5,644,179 A | 7/1997 | Staub et al. | |
| 6,122,917 A | 9/2000 | Senior | |
| 6,204,580 B1 | 3/2001 | Kazmierczak | |
| 6,252,318 B1 | 6/2001 | Kazmierczak | |
| 6,346,754 B1 * | 2/2002 | Kieda et al. | 310/58 |
| 6,392,326 B1 * | 5/2002 | Turnbull et al. | 310/270 |
| 6,417,586 B1 * | 7/2002 | Jarczynski et al. | 310/61 |
| 6,452,294 B1 | 9/2002 | Vandervort et al. | |
| 6,465,917 B2 | 10/2002 | Wetzel et al. | |
| 6,495,943 B2 | 12/2002 | Wetzel et al. | |
| 6,628,020 B1 | 9/2003 | Tong | |
| 6,720,687 B2 * | 4/2004 | Salamah et al. | 310/61 |
| 6,759,770 B1 * | 7/2004 | Wang et al. | 310/52 |
| 6,870,299 B1 | 3/2005 | Moeleker et al. | |
| 2007/0222333 A1 * | 9/2007 | Hattori et al. | 310/270 |

OTHER PUBLICATIONS

Le, Dang, D., U.S. Appl. No. 12/431,054, Office Action, 226955-1, Sep. 17, 2010, 13 pages.

* cited by examiner

*Primary Examiner* — Quyen Leung
*Assistant Examiner* — Thomas Truong
(74) *Attorney, Agent, or Firm* — Hoffman Warnick LLC; Ernest G. Cusick

(57) ABSTRACT

A dynamoelectric machine includes a rotor having a plurality of adjacent coils; a spaceblock disposed between adjacent coils so as to define first and second cavities adjacent the spaceblock and between mutually adjacent coils; and the spaceblock includes a channel disposed in a coil facing surface of the spaceblock for intercepting and redirecting a circulating coolant flow to the first cavity.

18 Claims, 6 Drawing Sheets

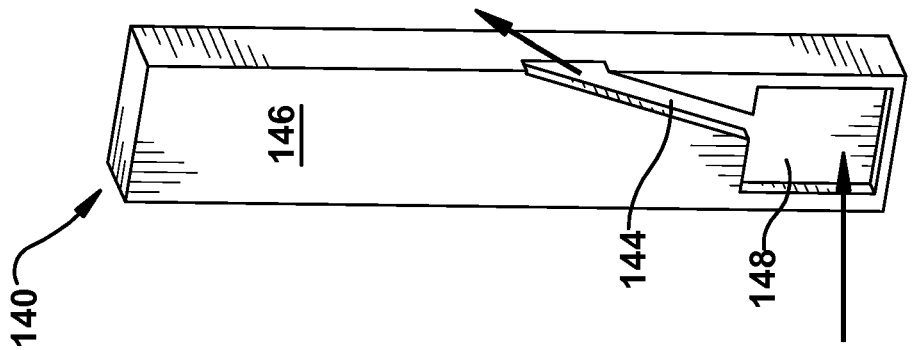
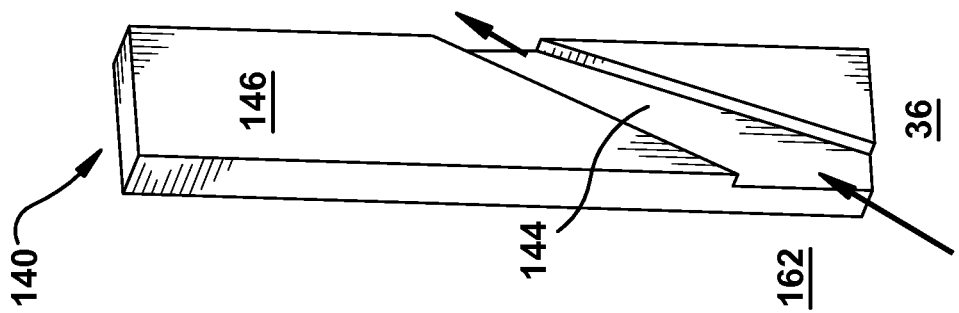
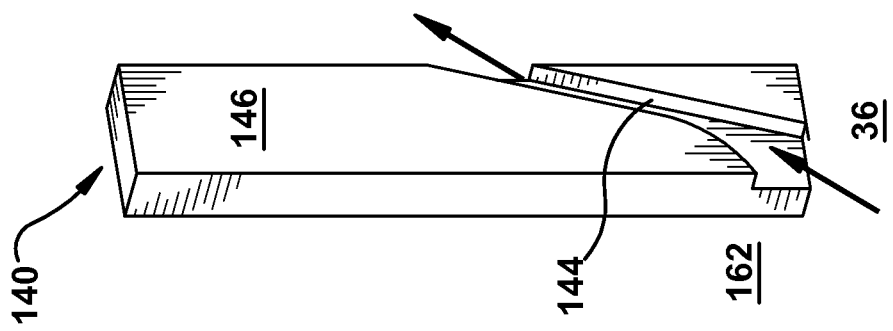
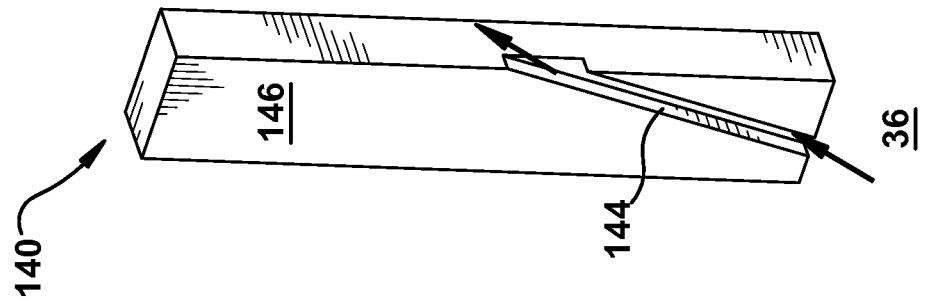

DYNAMOELECTRIC MACHINE COIL SPACERBLOCK HAVING FLOW DEFLECTING CHANNEL IN COIL FACING SURFACE THEREOF

BACKGROUND OF THE INVENTION

The present invention relates to a structure for enhanced cooling of a dynamoelectric machine rotor by intercepting and redirecting a circulating coolant flow to an adjacent cavity.

Large dynamoelectric machines, such as a turbo-generator, the rotor consists of machined slots along its length in which copper coils are placed. The portions of these coils which extend outside the rotor body are called endwindings. In the endwinding region of a rotor, coils are held tightly by spaceblocks, which are further classified as space, spacer and wedge blocks, depending on their location.

The power output rating of dynamoelectric machines is often limited by the ability to provide additional current through the rotor field winding because of temperature limitations imposed on the electrical conductor insulation. Therefore, effective cooling of the rotor winding contributes directly to the output capability of the machine. This is especially true of the rotor endwindings, where direct, forced cooling is difficult and expensive due to the typical construction of these machines. As prevailing market trends require higher efficiency and higher reliability in lower cost, higher-power density generators, cooling the rotor endwindings becomes a limiting factor. In order to cool the endwindings and coils, a circulating coolant flow is passed through the cavities between spaceblocks and coils, and enters the grooves in coils, which start from these cavities and discharge into a chimney.

BRIEF DESCRIPTION OF THE INVENTION

A first aspect of the disclosure provides a dynamoelectric machine, comprising: a rotor having a plurality of adjacent coils; a spaceblock disposed between adjacent coils so as to define at least a first cavity adjacent the spaceblock and between mutually adjacent coils; and wherein the spaceblock includes a channel disposed in a coil facing surface of the spaceblock for intercepting and redirecting a circulating coolant flow to the first cavity.

A second aspect of the disclosure provides a gas-cooled dynamoelectric machine, comprising: a rotor having a spindle and a body portion; a rotor winding including a plurality of adjacent coils, the plurality of adjacent coils including axially extending coils disposed on the body portion and end straps extending axially beyond at least one end of the body portion, the coils and the spindle defining an annular region therebetween; a plurality of spaceblocks located between adjacent ones of the coils to thereby define first and second cavities, each cavity open to the annular region and bounded by adjacent spaceblocks and adjacent coils; and wherein each spaceblock includes a channel disposed in a coil facing surface of the spaceblock for intercepting and redirecting a circulating coolant flow to the first cavity.

A third aspect is directed to a spaceblock for a gas-cooled dynamoelectric machine, the spaceblock comprising: a block member for mounting between adjacent coils of a rotor winding of the gas-cooled dynamoelectric machine to thereby define first and second cavities adjacent to the block member; and a channel disposed in a coil facing surface of the block member for intercepting and redirecting a circulating coolant flow to the first cavity.

BRIEF DESCRIPTION OF THE DRAWINGS

FIGS. 5-10 are enlarged perspective views of embodiments of a spaceblock according to the invention.

DETAILED DESCRIPTION OF THE INVENTION

Figure 1:
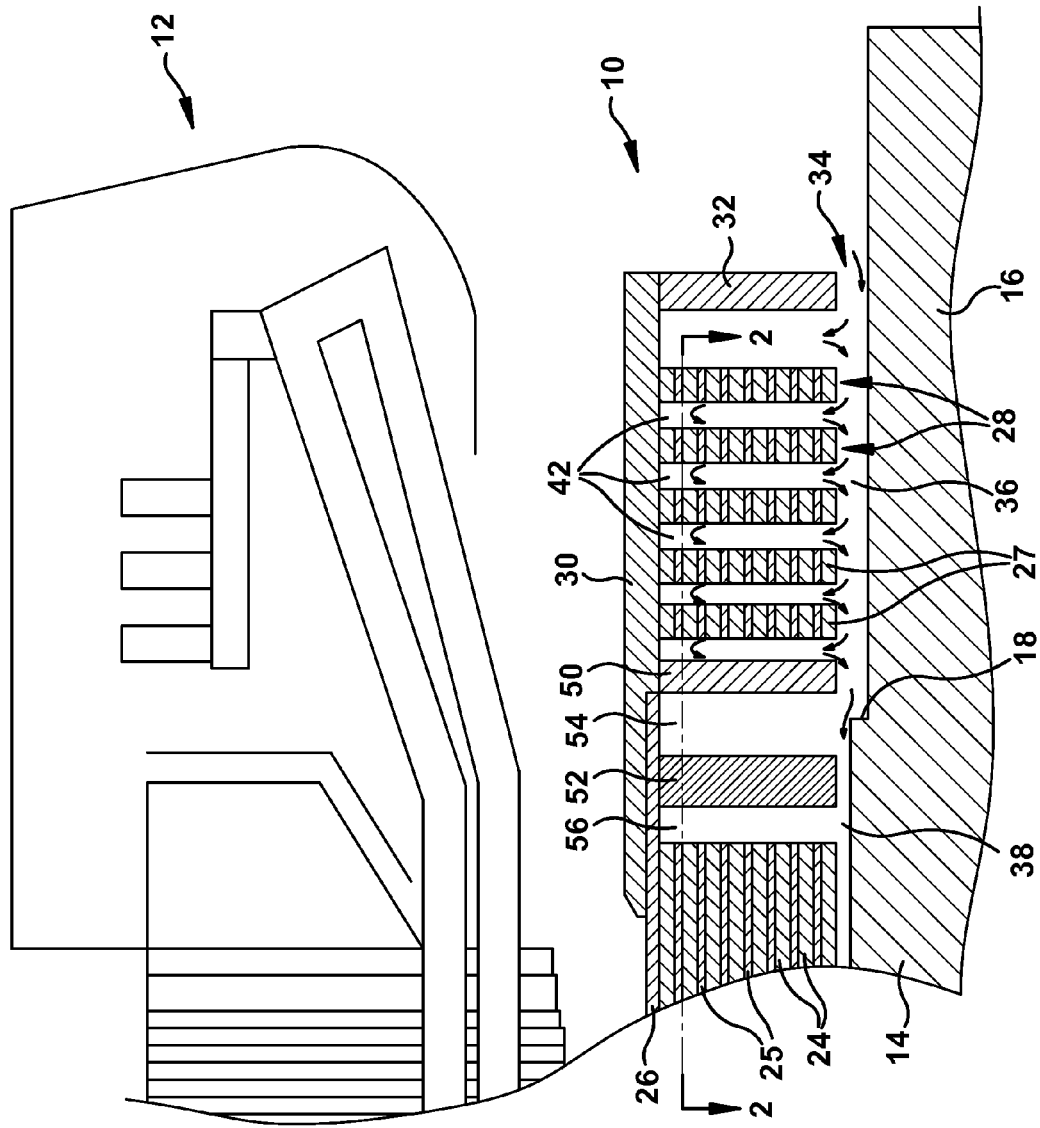
FIG. 1 is a cross-sectional view of a portion of the endwindings of a dynamoelectric machine rotor with stator in opposed facing relation thereto.
Figure 2:
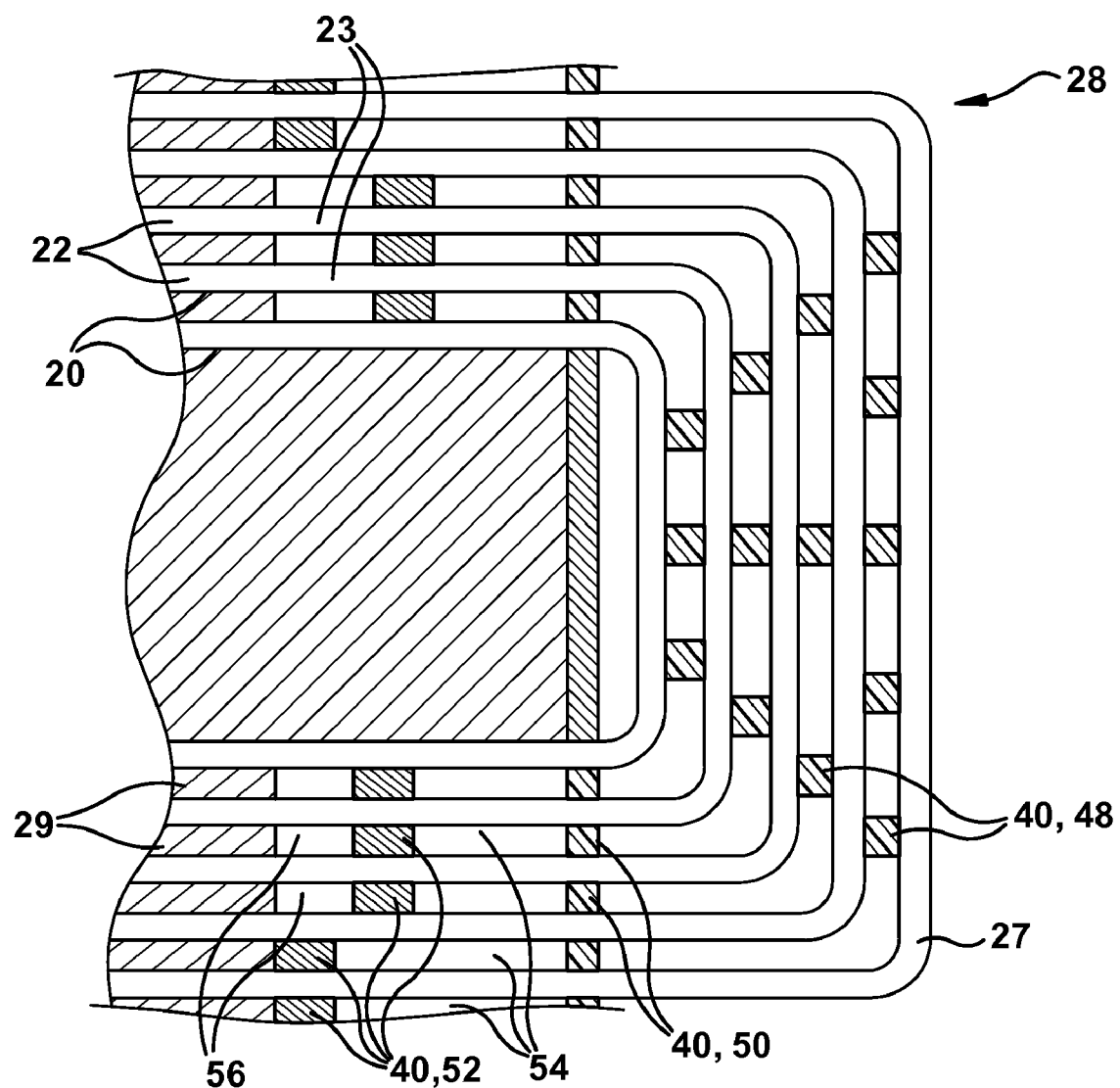
FIG. 2 is a cross-sectional top view of the dynamoelectric machine rotor taken along line 2-2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars 24 are separated by layers of electrical insulation 25. The stacked conductor bars are typically maintained in the slots by wedges 26 (FIG. 1) and are made of a conductive material such as copper. Conductor bars 24 are interconnected at each opposing end of the body portion by end turns 27 of the coils, in an area which may be referred to as the end strap region. Coils 22 include a coil side section including axially extending coils 23 and extend axially beyond the end faces to the end strap region. Collectively, axially extending coils 23 and end turns 27 are referred to as endwindings 28. The end turns 27 are also separated by layers of electrical insulation.

Referring specifically to FIG. 1, a retaining ring 30 is disposed around the end turns at each end of the body portion to hold endwindings 28 in place against centrifugal forces. Retaining ring 30 is fixed at one end to the body portion and extends out over rotor spindle 16. A centering ring 32 is attached to the distal end of retaining ring 30. It should be noted that retaining ring 30 and centering ring 32 can be mounted in other ways, as is known in the art. The inner peripheral edge of centering ring 32 is radially spaced from rotor spindle 16 so as to form a gas inlet passage 34, and endwindings 28 are spaced from rotor spindle 16 so as to define an annular region 36. A number of axial cooling channels 38 formed along slots 20 (FIG. 2) are provided in fluid communication with the gas inlet passage 34 via the annular region 36 to deliver cooling gas to the coils 22 (FIG. 2).

Turning to FIG. 2, end turns 27 at each end of rotor 10 (FIG. 1) may be circumferentially and axially separated by a number of spacers or spaceblocks 40. (For clarity of illustration, the spaceblocks are not shown in FIG. 1). Where spaceblocks 40 are disposed between end turns 27, they may be referred to as an end strap block 48. Furthermore, axially extending coils 23 may be circumferentially separated by a number of spaceblocks 40. In this location, spaceblocks 40 may be referred to as coil side blocks 50 or body wedge blocks 52. The term "wedge" may be applied to these blocks because they may be provided with a wedge shape to accommodate the arcuate shape required to mate with coils 23 in this location. In any event, spaceblocks 40 are elongated block members of an insulating material located in the spaces between adjacent coils whether at the axially extending coil side section or end strap region. Spaceblocks 40 may extend beyond the full radial depth of the endstrap section or the coil side section into annular gap 36.

Figure 3:
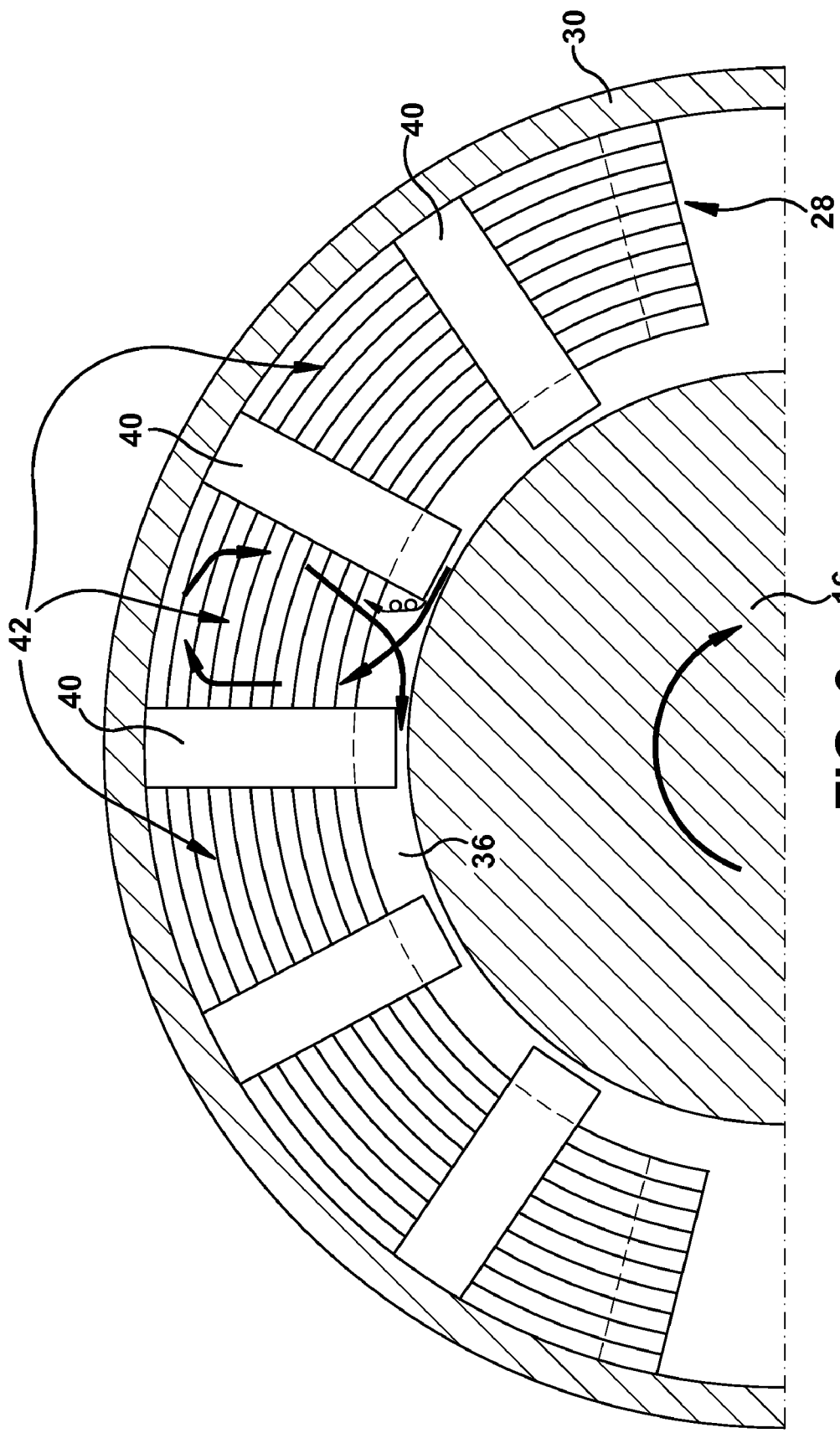
FIG. 3 is a schematic illustration showing conventional passive gas flow into and through endwinding cavities.
Figure 4:
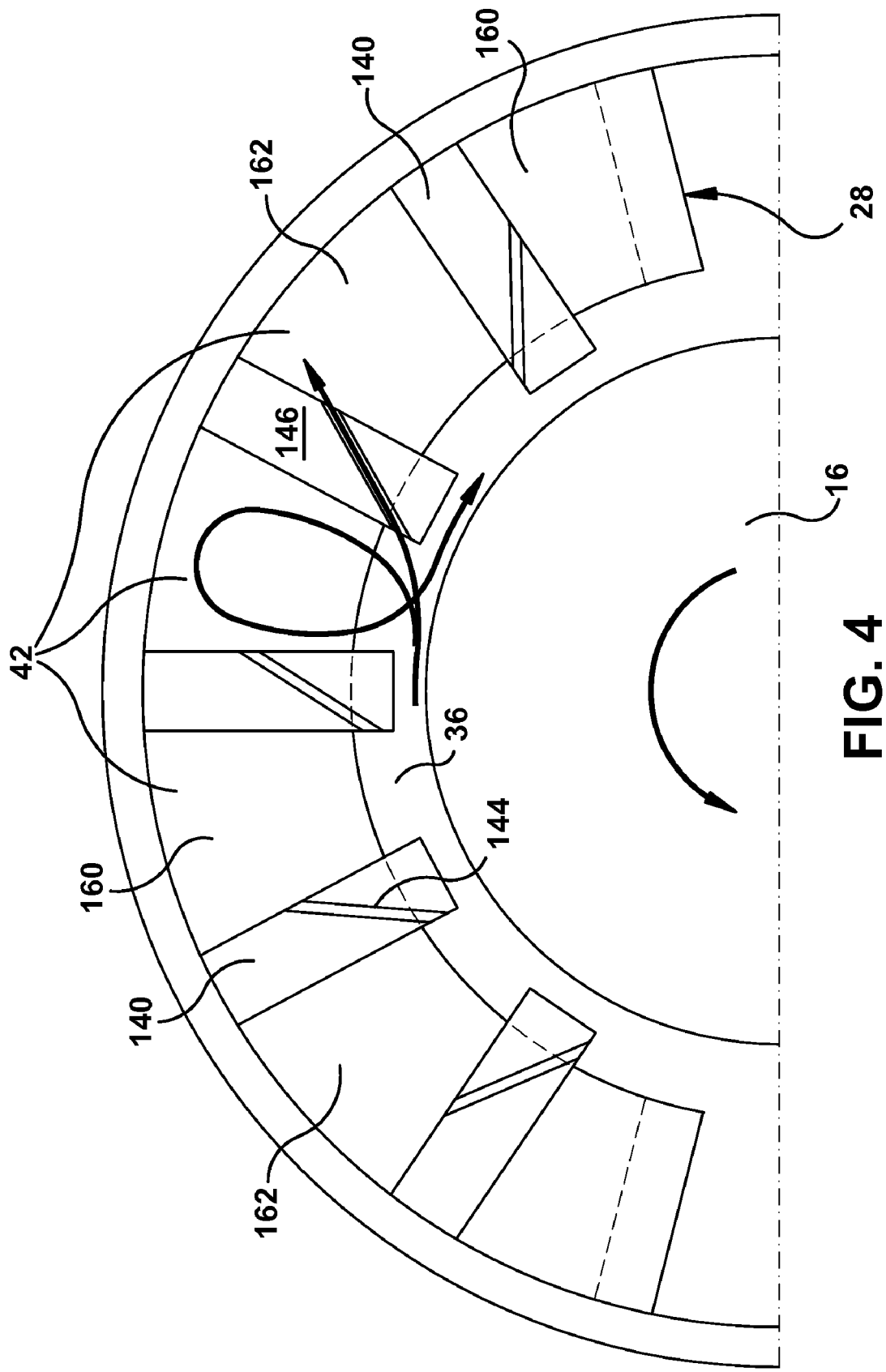
FIG. 4 is a schematic illustration showing an embodiment of a gas-cooled dynamoelectric machine including a spaceblock according to embodiments of the invention.

As shown best in FIG. 4, in most cases, a spaceblock 140 disposed between adjacent coils (whether axially extending coils 23 or end straps 27) defines first and second cavities 160, 162, respectively, adjacent to spaceblock 140 and between mutually adjacent coils. The spaces between the concentric stacks of endwindings 28 (FIG. 3) are divided into cavities 42. These cavities are bounded on the top by retaining ring 30 and on four sides by adjacent end straps 27 and adjacent spaceblocks 48, as shown in FIG. 2. Similarly, as shown best in FIG. 2, spaceblocks 40 between radial stacks of axially extending coils 23 may be divided into cavities 54, 56. Typically, as shown for the outermost coils in FIG. 2, spaceblock 40 (body wedge blocks 52) disposed between adjacent coils 23 define only one cavity 54 adjacent thereto because the spaceblock is disposed directly against an end of a rotor tooth 29. Cavities 54 are bounded on the top by retaining ring 30 and on four sides by adjacent coils 23 and adjacent spaceblocks 40 (coil side block 50 and body wedge block 52). In accordance with embodiments of the invention, however, as shown for the innermost coils in FIG. 2, cavities 56 may also be present where spaceblock 40 (body wedge block 52) is not against an end of rotor tooth 29. Cavities 56 may be bounded on the top by retaining ring 30 (or wedges 26 (FIG. 1)) and on four sides by adjacent coils 23, adjacent spaceblocks 40 (coil space blocks 50) and an end of rotor tooth 29. FIG. 1 shows this latter situation.

As best seen in FIG. 1, each of the above-described cavities is in fluid communication with gas inlet passage 34 via annular region 36. A portion of the cooling gas entering annular region 36 between endwindings 28 and rotor spindle 16 through gas inlet passage 34 thus enters the cavities 42, 54, 56, circulates therein, and then returns to annular region 36 between the endwinding and the rotor spindle. Gas flow is shown by the arrows in FIGS. 1, 3 and 4. Depending on the direction of coolant flow, any of cavities 42, 54 and 56 may constitute the first cavity 160 or second cavity 162.

The inherent pumping action and rotational forces acting in a rotating generator cavity typically produce a large single flow circulation cell, as schematically shown in FIG. 3. This flow circulation cell exhibits its highest velocity near the peripheral edges of the cavity, leaving the center region inadequately cooled due to the inherently low velocity in the center region of the cavity. As can be seen from FIG. 3, large areas of the corner regions are also inadequately cooled because the circular motion of the flow cell does not carry cooling flow into the corners.

Referring now to FIG. 4, according to embodiments of the invention, at least one and preferably each spaceblock 140 includes a channel 144 disposed in a coil facing surface 146 of the spaceblock for intercepting and redirecting a circulating coolant flow to a first cavity adjacent thereto. In FIG. 4, spaceblocks 140 are illustrated in a partial section of the rotor endwinding assembly in the setting of cavities 42, i.e., end straps 27. Similarly, spaceblock 140 may be disposed within axially extending coils 23 as shown in FIG. 2. Thus, spaceblock 140 may be disposed within axially extending coils 23 and/or end straps 27, as shown best in FIGS. 1-2. Consequently, as used herein, "coil facing" may mean facing axially extending coils 23 or end straps 27, collectively coils 22 of endwindings 28. Channel 144 presents a trough or trench open to coils 23 or end straps 27 through which circulating coolant flow can pass from one location to first cavity 160, thus improving coolant flow between cavities, and also providing direct convection cooling of a surface of axially extending coils 23 or end straps 27.

Figure 6:
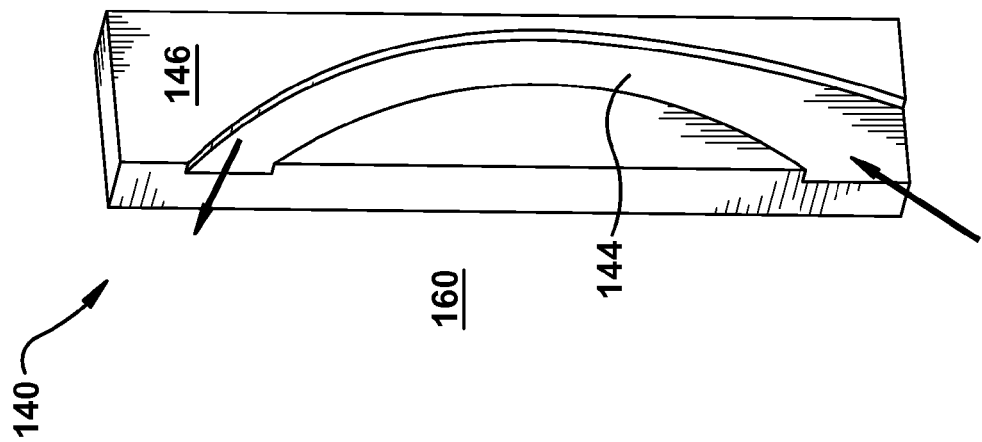
Figure 5:
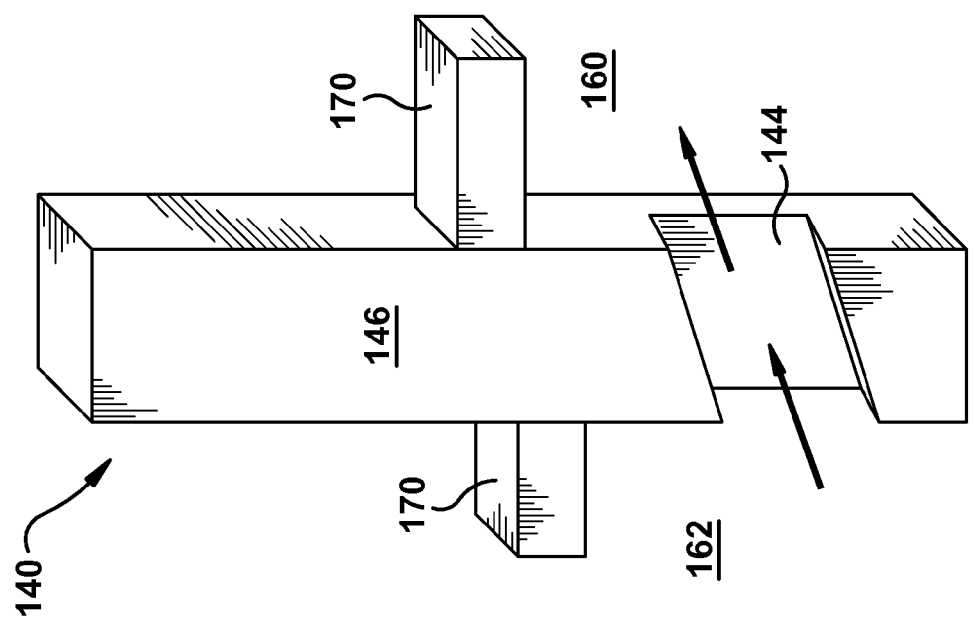

FIGS. 5-10 show enlarged perspective views of different embodiments of spaceblock 140, and in particular, different channels 140 that may be employed. Gas flow is shown by the arrows in FIGS. 5-10. As shown in FIG. 4 and FIG. 5, in one embodiment, channel 144 may intercept and redirect the circulating coolant flow from a second cavity 162, i.e., a cavity on the other side of spaceblock 140 from first cavity 160. FIG. 6 illustrates an embodiment in which channel 144 intercepts and redirects the circulating coolant flow from first cavity 160, i.e., channel 144 takes coolant flow from first cavity 160 and returns it at a different location within the first cavity. This embodiment may find applicability where spaceblock 140 has only one cavity adjacent thereto. This may occur, for example, as shown for the outermost coils in FIG. 2, for body wedge blocks 52 positioned directly against an end of rotor tooth 29, i.e., where no cavity 56 exists.

FIG. 7 illustrates a channel 144 that intercepts and redirects the circulating coolant flow from annular region 36 about spindle 16 of rotor 10. FIGS. 8 and 9 illustrate a channel 144 that in addition to taking coolant flow from annular region 36, also may intercept and redirect the circulating coolant flow from second cavity 162. That is, coolant flow may be taken from both annular region 36 and second cavity 162.

FIG. 10 illustrates a channel 144 that intercepts and redirects the circulating coolant flow from coil 22 (axially extending coil 23 or end strap 27) that the channel faces. In this embodiment, a pocket 148 may be disposed in surface 146 of spaceblock 140 which is in fluid communication with the channel such that a circulating coolant flow may be originated from the coil or endwinding. In this case, coil 22 has sufficient spacing between layers to allow for the coolant flow to be generated.

Although particular embodiments of channel 144 have been illustrated, it is emphasized that channel 144 may take a variety of different shapes not explicitly illustrated and that embodiments illustrated may be combined to provide a large variety of possible channel structures within the scope of the invention.

Returning to FIG. 5, in an alternative embodiment, any of the above-described spaceblock 140 and channel 144 configurations may also employ a flow deflector structure 170 facing first cavity 160 and/or second cavity 162. Although shown in a block format, flow deflector structure 170 may take the shape of a structure as described, for example, in U.S. Pat. No. 6,465,917 or in U.S. patent application Ser. No. 12/431,054, each of which is hereby incorporated by reference. As described in the reference patent and application, flow deflector structure 170 redistributes coolant flow to the center of a respective cavity to increase the heat transfer coefficient there.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dynamoelectric machine, comprising:
   a rotor having a plurality of adjacent coils;
   an annular region located about a spindle of the rotor and radially inboard of the plurality of adjacent coils; and
   a spaceblock disposed between two of the plurality of adjacent coils so as to define at least a first cavity adjacent the spaceblock and between the two adjacent coils;
   wherein the spaceblock includes a fluid opening in the annular region and a channel disposed in a coil facing surface of the spaceblock for intercepting a coolant flow from the annular region via the fluid opening and redirecting the coolant flow at least partially radially to the first cavity, the channel being tapered from the fluid opening to a second opening in the first cavity.

2. The dynamoelectric machine of claim 1, wherein the channel intercepts and redirects the coolant flow from a first portion of the first cavity into a second portion of the first cavity.

3. The dynamoelectric machine of claim 1, wherein the channel further intercepts and redirects a second coolant flow from a second cavity, the second cavity being adjacent the spaceblock and between mutually adjacent coils.

4. The dynamoelectric machine of claim 1, wherein the channel intercepts and redirects a portion of the coolant flow proximate the coil that the channel faces.

5. The dynamoelectric machine of claim 4, further comprising a pocket disposed in the surface of the spaceblock and in fluid communication with the channel.

6. The dynamoelectric machine of claim 1, wherein the channel defined by the spaceblock is substantially trihedral.

7. The dynamoelectric machine of claim 1, wherein the rotor includes a body portion, and each of the plurality of coils includes axially extending coils and end turns defining a plurality of endwindings extending axially beyond at least one end of the body portion.

8. The dynamoelectric machine of claim 1, wherein the channel has a substantially non-uniform cross-section.

9. The dynamoelectric machine of claim 1, further comprising at least one flow deflector structure disposed radially outboard of the channel on at least one cavity facing surface of the spaceblock.

10. A gas-cooled dynamoelectric machine, comprising:
    a rotor having a spindle and a body portion;
    a rotor winding including a plurality of adjacent coils, the plurality of adjacent coils including axially extending coils disposed on the body portion and end straps extending axially beyond at least one end of the body portion, the coils and the spindle defining an annular region therebetween; and
    a plurality of spaceblocks located in an axially extending coil side section of the rotor between adjacent sets of the coils to thereby define first and second cavities, each cavity open to the annular region and bounded by adjacent spaceblocks and adjacent coils;
    wherein each spaceblock includes a fluid opening in the annular region and a channel disposed in a coil facing surface of the spaceblock for intercepting a coolant flow from the annular region via the fluid opening and redirecting the coolant flow to the first cavity, the channel being tapered from the fluid opening to a second opening in the first cavity.

11. The gas-cooled dynamoelectric machine of claim 10, wherein the channel intercepts and redirects the coolant flow from a first portion of the first cavity into a second portion of the first cavity.

12. The gas-cooled dynamoelectric machine of claim 10, wherein the channel further intercepts and redirects a second coolant flow from the second cavity.

13. The gas-cooled dynamoelectric machine of claim 10, wherein the channel intercepts and redirects a portion of the coolant flow proximate the coil that the channel faces.

14. The gas-cooled dynamoelectric machine of claim 13, further comprising a pocket disposed in the surface of the spaceblock and in fluid communication with the channel.

15. The gas-cooled dynamoelectric machine of claim 10, further comprising at least one flow deflector disposed radially outboard of the channel on at least one cavity facing surface of the spaceblock.

16. The gas-cooled dynamoelectric machine of claim 10, wherein the channel has a non-uniform cross-section.

17. A spaceblock for a gas-cooled dynamoelectric machine, the spaceblock comprising:
    a block member for mounting between adjacent coils of a rotor winding of the gas-cooled dynamoelectric machine to thereby define first and second cavities adjacent to the block member; and
    a channel disposed in a coil facing surface of the block member for intercepting a coolant flow from an annular region located about the rotor winding and redirecting the coolant flow to the first cavity, the channel being tapered from a first opening in the annular region to a second opening in the first cavity.

18. The spaceblock of claim 17, wherein the channel further intercepts and redirects a second coolant flow into the first cavity from a second cavity, the second cavity being adjacent the spaceblock.

* * * * *